United States Patent [19]

Hara et al.

[11] Patent Number: 4,741,602

[45] Date of Patent: May 3, 1988

[54] SPATIAL LIGHT MODULATOR

[75] Inventors: Tsutomu Hara; Yoshiji Suzuki, both of Hamamatsu, Japan

[73] Assignee: Hamamatsu Photonics Kabushiki Kaisha, Hamamatsu, Japan

[21] Appl. No.: 887,610

[22] Filed: Jul. 21, 1986

[30] Foreign Application Priority Data

Aug. 20, 1985 [JP] Japan .................................. 60-182794
Aug. 20, 1985 [JP] Japan .................................. 60-182795

[51] Int. Cl.$^4$ .......................... G02F 1/03; G02F 1/05; G02B 5/30
[52] U.S. Cl. ...................................... 350/356; 350/393
[58] Field of Search ................ 350/356, 393, 392, 355

[56] References Cited

U.S. PATENT DOCUMENTS

| 3,637,931 | 1/1972 | Donjon et al. | 350/393 X |
|---|---|---|---|
| 3,700,902 | 10/1972 | Buchan | 350/393 X |
| 3,702,215 | 11/1972 | Cummins | 350/393 X |
| 3,878,328 | 4/1975 | Marie et al. | 350/393 X |
| 4,481,531 | 11/1984 | Warde et al. | 350/393 X |
| 4,626,075 | 12/1986 | Chemla | 350/393 X |
| 4,678,286 | 7/1987 | Hara | 350/356 |

OTHER PUBLICATIONS

Briton, "Electronic Modulator Speeds Up Processing For Optical Computer", *Electronics Review,* Jun. 7, 1979, pp. 41–42.

C. Warde et al., "Microchannel Spatial Light Modulator", *Optic Letters,* vol. 3, No. 5, Nov. 1978, pp. 196–198.

Evert Lindberg, "Solid Crystal Modulate Light Beams", *Electronics,* Dec. 20, 1963, pp. 58–61.

*Primary Examiner*—Eugene R. LaRoche
*Assistant Examiner*—Nathan W. McCutcheon
*Attorney, Agent, or Firm*—Spencer & Frank

[57] ABSTRACT

A spatial light modulator consists of an electron beam source formed within a vacuum envelope and an electro-optic crystal or organic film whose optical property changes corresponding to the charge stored on the surface thereof. The electro-optic crystal or organic film is fastened to the substrate through adhesive or the transparent conductive film which is covered with a low-vapor-pressure material.

2 Claims, 2 Drawing Sheets

SPATIAL LIGHT MODULATOR

BACKGROUND OF THE INVENTION

The present invention relates to a first type of spatial light modulator consisting of an electron beam source, i.e., a photocathode or an electron gun and an electro-optic crystal whose optical property changes corresponding to the charge thereon, and also relates to a second type of spatial light modulator consisting of an electron beam source, i.e., a photocathode or an electron gun and an organic film whose optical property changes corresponding to the charge thereon.

The electro-optic crystal used in a spatial light modulator is conventionally supported within a vacuum envelope by mechanical means. The electro-optic crystal must be thin enough i.e., 0.3 mm, to enhance the resolution. However, the crystal may be bent if fastened to the support by mechanical means.

The inventors of this invention previously disclosed in Japanese Patent Applications Nos. 41180/1983 and 171194/1984 that the crystal bulk fastened to the substrate is first lapped to form a thin wafer, and then housed in a vacuum envelope.

The disclosure states that a thin crystal wafer lapped to enhance the resolution of the spatial light modulator can be advantageously fastened to the support without any mechanical distortion.

Adhesive to fasten the crystal wafer to the support exhausts gases into a vacuum envelope, and the gases make fabrication of the photocathode difficult. After completion of the photocathode, the gases make the sensitivity of the photocathode low.

If an electron gun is used in place of the photocathode used as an electron beam source in the spatial light modulator, the gases shorten the life of the device.

In addition to the mechanical distortion, the response time limitation is enhanced by thinning the electro-optic crystal wafer.

The conventional spatial light modulator consists of an electron beam source built in a vacuum envelope and an electro-optic crystal wherein the refractive index (showing birefringency) thereof changes corresponding to the charge at the surface thereof when the charge is formed by the electrons emitted from the electron beam source. The electro-optic crystal must be thin enough to enhance the resolution. However, the charge is increased by thinning the crystal wafer, and the increased charge can make the response time low.

Thus, an organic film has been recently used in place of the electro-optic crystal wafer, because some organic materials have been known to have a large electro-optic effect.

An organic material is housed in the vacuum envelope of the spatial light modulator, and gases are exhausted from the organic material. The gases can make fabrication of the photocathode fabricated difficult, and the sensitivity of the photocathode low.

Gases exhausted from the organic film in the spatial light modulator, wherein an electron gun is used in place of a photocathode used as an electron beam source, shorten the life of the device.

The first objective of the present invention is to provide a new type of spatial light modulator wherein gases exhausted from the adhesive fastening the crystal wafer to the substrate can be reduced by covering the adhesive with a material with low vapor pressure.

The second objective of the invention is to present another new type of spatial light modulator wherein gases exhausted from an organic film can be reduced by covering the organic film with a material with low vapor pressure.

SUMMARY OF THE INVENTION

A spatial light modulator in accordance with the invention consists of an electron beam source formed within a vacuum envelope and a crystal wafer whose optical property changes corresponding to electron charge collected at the surface thereof, wherein the crystal wafer is fastened to the substrate through a transparent conductive film by means of adhesive and the exposed portion of the adhesive at the interface between the substrate and the crystal wafer is covered and sealed with a material with low vapor pressure.

Another spatial light modulator in accordance with the invention consists of an electron beam source formed within a vacuum envelope and an organic film whose optical property changes corresponding to the electron charge collected at the surface thereof, wherein the organic film is fastened to the substrate through a transparent conductive film and at least the exposed portion of the surface of the organic film is covered and sealed with a material with low vapor pressure.

DESCRIPTION OF THE PREFERRED EMBODIMENTS

Figure 1:
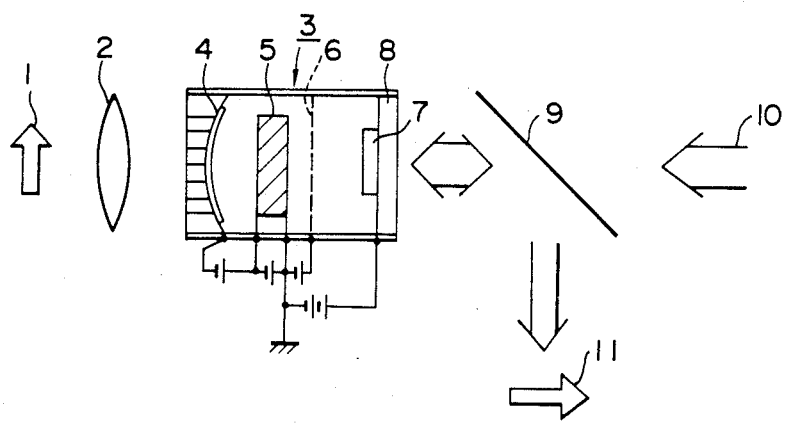
FIG. 1 is a schematic diagram of an application of the first embodiment of the spatial light modulator built in accordance with the present invention.

The present invention will be described hereafter referring to the drawings.

FIG. 1 is a schematic diagram of an applicaton of the first embodiment of the spatial light modulator built in accordance with the invention. The principle and operation of the application will be described referring to FIG. 1.

Incoherent light image 1 is projected onto photocathode 4 of spatial light modulator 3 through lens 2.

Photoelectrons are emitted from photocathode 4 corresponding to image 1, multiplied by microchannel plate 5, and then stored on the surface of electro-optic crystal 7 to form a charge image. Metallic mesh electrode 6 catches secondary electrons generated when a charge is impressed on the crystal 7 and prevents redistribution of the charge onto the crystal.

The refractive index of electrooptic crystal 7 changes corresponding to the charge image.

Laser beam 10 incident on the electro-optic crystal 7 passing through a harp mirror or beam splitter 9 and an output glass window 8 is modulated within electro-optic crystal 7 reflected therefrom to beam splitter 9 where it is reflected to the output where it appears as a coherent image 11.

Such a coherent image as shown in FIG. 1 can be used to perform an optically parallel processing operation of coherent light.

Figure 2:
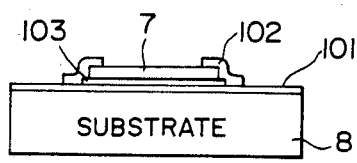
FIG. 2 is a cross-sectional view of an assembly consisting of an electro-optic crystal and an output glass window in the first embodiment of the present invention.

FIG. 2 shows a cross-sectional view of an assembly consisting of the electro-optic crystal 7 and the output glass window 8 used as a substrate.

Transparent conductive film (ITO) 101 is formed on the surface of output glass window 8 used as a substrate and electro-optic crystal 7 is fastened to the substrate via adhesive 103, i.e., UV-cured adhesive.

The surface of electroptic crystal 7 is then polished to form an electro-optic crystal wafer with a thickness of 100 μm or less and to make it optically flat.

The adhesive at the interface between crystal 7 and substrate 8 is covered and sealed with $SiO_2$ layer 102 formed by RF sputtering.

Figure 3:
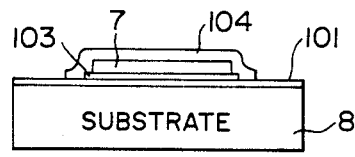
FIG. 3 is a cross-sectional view of another assembly consisting of an electro-optic crystal and an output glass window in the first embodiment.

FIG. 3 is another cross-sectional view of an assembly consisting of the electrooptic crystal 7 and the output glass window 8.

Transparent conductive film 101 is formed on the surface of output glass window 8 in the same manner as shown in FIG. 2, and electrooptic crystal 7 is fastened to the substrate 8 via adhesive 103.

The surface of electrooptic crystal 7 is polished, and a dielectric mirror layer 104 consisting of a multiple of $SiO_2$ and $ZrO_2$ films is formed onto the surface thereof.

Although the crystal wafer in each of the above embodiments is fastened to the respective output glass window by using adhesive, it can be fastened to the other type of substrate, i.e., thick crystal wafer, and the adhesive at the interface between the electro-optic crystal and the substrate can be protected by an overcoat in accordance with the above principle.

Figure 4:
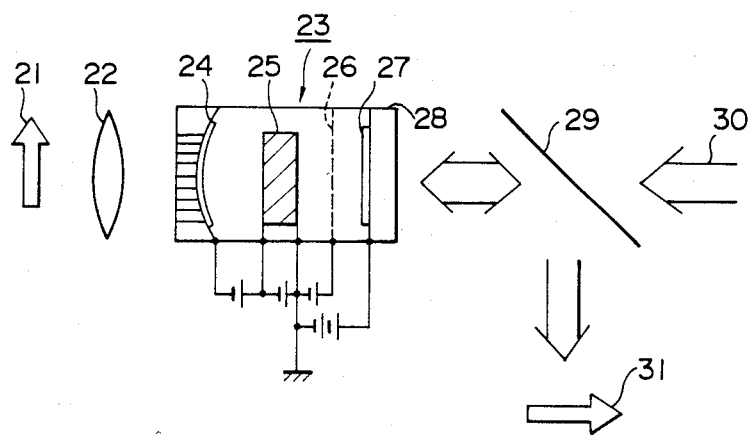
FIG. 4 is a schematic diagram of an applicaton of the spatial light modulator in accordance with the second embodiment of the present invention.

FIG. 4 is a schematic diagram of an application of the second embodiment of the spatial light modulator in accordance with the present invention.

Incoherent light image 21 is projected onto photocathode 24 of spatial light modulator 23 through lens 22.

Photoelectrons are emitted from photocathode 24 corresponding to image 21, multiplied by microchannel plate 25, and then stored on the surface of organic film 27 to form a charge image. The mesh electrode 26 catches secondary electrons generated when a charge is impressed on the film 27 and prevents redistribution of the charge on the film.

Organic film 27 is made of metanitroaniline, and the refractive index of organic film 27 changes corresponding to the charge image.

Laser beam 30 incident on the organic film 27 passing through a half mirror or beam splitter or an output glass window 28 is modulated within organic film 27 reflected therefrom to beam splitter 29 where it is reflected to the output where it appears as a coherent image 31.

Such a coherent image as shown in FIG. 4 can be used to perform an optically parallel processing operation of coherent light.

Figure 5:
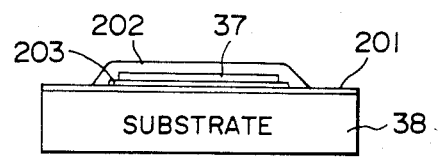
FIG. 5 is a cross-sectional view of an assembly consisting of an organic crystal and an output glass window in the second embodiment.

FIG. 5 is a cross-sectional view of an assembly consisting of the organic crystal 37 and output glass window 38 used as a substrate.

Transparent conductive film (ITO) 201 is formed on the surface of output glass window 38 used as a substrate and organic film 37 is fastened to the substrate via adhesive 203, i.e., UV-cured adhesive, or directly crystal-grown onto the substrate.

Thereafter, the device is wholly covered with a $SiO_2$ layer formed by RF sputtering, or with alternate high and low refractive index layers formed by alternate evaporation of $SiO_2$ and $ZrO_2$ to form a dielectric mirror 202.

The organic film can also be made of urea or methylnitroaniline.

As described heretofore, the interface between adhesive and/or an organic material and vacuum is covered and sealed with a material with low vapor pressure, and this material protects the device built within a vacuum envelope against contamination of gases exhausted from adhesive and/or an organic material.

This allows the photocathode to be fabricated easily and the sensitivity of the photocathode to be increased. It also elongates the life of the device wherein an electron gun is used.

What is claimed is:

1. A spatial light modulator, comprising:
a vacuum envelope;
a source for an electron beam, within said envelope;
a substrate;
an electro-optical crystal having a surface and being disposed on said substrate; said crystal being located to be exposed to the electron beam in said envelope, and having means for storing a charge on said surface and an optical property which corresponds to the amount of the charge stored by said storing means;
an adhesive fixing said crystal onto said substrate, said adhesive having an exposed portion; and
a low vapor pressure material covering said exposed portion of said adhesive, said material forming an overcoat sealing said adhesive.

2. A spatial light modulator, comprising:
a vacuum envelope;
a source for an electron beam, within said envelope;
a substrate;
an adhesive on said substrate having an exposed portion;
an organic film having a surface, said film having an exposed portion and being formed on said adhesive; said film being located to be exposed to the electron beam in said envelope, and having means for storing a charge on said surface and an optical property which corresponds to the amount of the charge stored by said storing means; and
a low vapor pressure material covering said exposed portion of said adhesive and said exposed portion of said film, said material forming an overcoat sealing said film and said adhesive.

* * * * *